US011720818B2

(12) United States Patent
Ribera Prat et al.

(10) Patent No.: US 11,720,818 B2
(45) Date of Patent: Aug. 8, 2023

(54) SYSTEM AND METHOD TO IMPROVE ACCURACY OF REGRESSION MODELS TRAINED WITH IMBALANCED DATA

(71) Applicant: Samsung Display Co., Ltd., Yongin-si (KR)

(72) Inventors: Javier Ribera Prat, San Jose, CA (US); Jalil Kamali, San Jose, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 920 days.

(21) Appl. No.: 16/661,866

(22) Filed: Oct. 23, 2019

(65) Prior Publication Data

US 2021/0073675 A1     Mar. 11, 2021

Related U.S. Application Data

(60) Provisional application No. 62/898,857, filed on Sep. 11, 2019.

(51) Int. Cl.
    *G06N 20/00*         (2019.01)
    *G06F 17/18*         (2006.01)
    *G06N 3/084*        (2023.01)

(52) U.S. Cl.
    CPC ............. *G06N 20/00* (2019.01); *G06F 17/18* (2013.01); *G06N 3/084* (2013.01)

(58) Field of Classification Search
    CPC ........ G06N 20/00; G06N 3/084; G06N 20/10; G06F 17/18
    See application file for complete search history.

(56) References Cited

U.S. PATENT DOCUMENTS 7,526,414 B2     4/2009   Comaniciu et al.
8,898,091 B2    11/2014   Frank et al.
(Continued)

FOREIGN PATENT DOCUMENTS

CN         110598837 A   *   12/2019
EP           3355270 A1   *    8/2018           G06K 9/6232
(Continued)

OTHER PUBLICATIONS

Cui et al., "Class-Balanced Loss Based on Effective Number of Samples", Jan. 16, 2019, arXiv, 1901.05555v1, pp. 1-11 (Year: 2019).*

(Continued)

*Primary Examiner* — Viker A Lamardo
*Assistant Examiner* — Leonard A Sieger
(74) *Attorney, Agent, or Firm* — Lewis Roca Rothgerber Christie LLP

(57) ABSTRACT

A method for training a machine learning model includes: receiving, by a computer system including a processor and memory, a training data set including imbalanced data; computing, by the computer system, a label density $f_X(x)$ in the training data set, computing, by the computer system, a weight function $w(x)$ including a term that is inversely proportional to the label density; weighting, by the computer system, a loss function $\mathcal{L}(x, \hat{x})$ in accordance with the weight function to generate a weighted loss function $\mathcal{L}_w(x, \hat{x})$; training, by the computer system, a continuous machine learning model in accordance with the training data set and the weighted loss function $\mathcal{L}_w(x, \hat{x})$; and outputting, by the computer system, the trained continuous machine learning model.

12 Claims, 9 Drawing Sheets

(56) References Cited

U.S. PATENT DOCUMENTS

| | | |
|---|---|---|
| 9,224,104 B2 | 12/2015 | Lin et al. |
| 2004/0122708 A1 | 6/2004 | Avinash et al. |
| 2013/0097103 A1 | 4/2013 | Chari et al. |
| 2017/0351948 A1 | 12/2017 | Lee et al. |

FOREIGN PATENT DOCUMENTS

| | | |
|---|---|---|
| KR | 10-2018-0120056 A | 11/2018 |
| WO | 2000/072257 A2 | 11/2000 |

OTHER PUBLICATIONS

Guizilini et al., "Continuous Convolutional Neural Networks for Image Classification", 2018, https://openreview.net/forum?id=BJjBnN9a-, pp. 1-12 (Year: 2018).*

Khan et al., "Cost-Sensitive Learning of Deep Feature Representations From Imbalanced Data", 2018, IEEE Transactions on Neural Networks and Learning Systems, vol. 9 No. 8, pp. 3573-3587 (Year: 2018).*

Tao et al., "Self-adaptive cost weights-based support vector machine cost-sensitive ensemble for imbalanced data classification", Jun. 2019, Information Sciences, vol. 487, pp. 31-56 (Year: 2019).*

Tomar et al., "An effective weighted multi-class least squares twin support vector machine for imbalanced data classification", 2015, International Journal of Computational Intelligence Systems, vol. 8(4), pp. 761-778 (Year: 2015).*

Cui et al., "Class-Balanced Loss Based on Effective Number of Samples", Jan. 16, 2019, arXiv, v1901.05555v1, pp. 1-11 (Year: 2019).*

Huang et al., "Cost-sensitive sparse linear regression for crowd counting with imbalanced training data", 2016, IEEE International Conference on Multimedia and Expo, vol. 2016, pp. 1-6 (Year: 2016).*

Branco et al., "Pre-processing approaches for imbalanced distributions in regression", Feb. 3, 2019, Neurocomputing, vol. 343, pp. 76-99 (Year: 2019).*

Yang et al., "Delving into Deep Imbalanced Regression", 2021, Proceedings of the 38th International Conference on Machine Learning, vol. 38 (2021), pp. 11842-11851 (Year: 2021).*

Steininger et al., "Density-based weighting for imbalanced regression", 2021, Machine Learning, vol. 110 (2021), pp. 2187-2211 (Year: 2021).*

\* cited by examiner

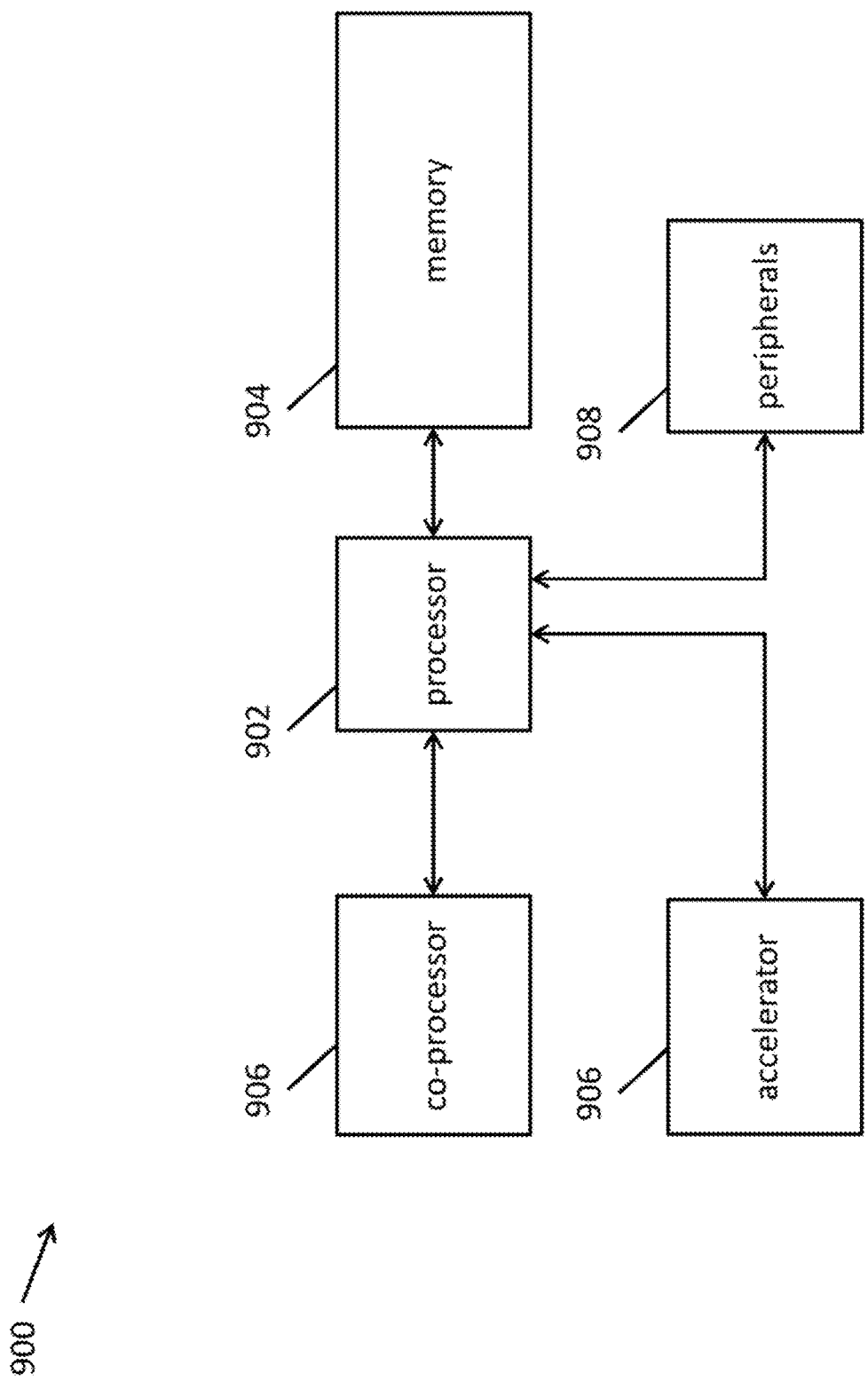

SYSTEM AND METHOD TO IMPROVE ACCURACY OF REGRESSION MODELS TRAINED WITH IMBALANCED DATA

CROSS-REFERENCE TO RELATED APPLICATION(S)

This application claims priority to, and the benefit of, U.S. Provisional Patent Application No. 62/898,857, filed in the United States Patent and Trademark Office on Sep. 11, 2019, the entire disclosure of which is incorporated by reference herein.

FIELD

Aspects of embodiments of the present disclosure relate to a system and method to improve the accuracy of regression models trained with imbalanced data.

BACKGROUND

Building and training models using machine learning generally involves learning a set of parameters of the model by adjusting the parameters to minimize a loss function with respect to a set of training data and verifying the training with respect to a set of test data. The parameters may be set or adjusted explicitly (e.g., by solving a system of equations) or may be computed through an iterative process such as gradient descent.

SUMMARY

Aspects of embodiments of the present disclosure relate to systems and methods for weighting a loss function to increase the influence of samples from portions of the training data that have fewer samples (or lower cardinality), thereby enabling the training of accurate regression models when the training data is highly imbalanced or highly non-uniform.

According to one embodiment of the present disclosure, a method for training a machine learning model includes: receiving, by a computer system including a processor and memory, a training data set including imbalanced data; computing, by the computer system, a label density $f_X(x)$ of the training data set; computing, by the computer system, a weight function $w(x)$ including a term that is inversely proportional to the label density; weighting, by the computer system, a loss function $\mathcal{L}(x, \hat{x})$ in accordance with the weight function to generate a weighted loss function $\mathcal{L}_w(x, \hat{x})$; training, by the computer system, a continuous machine learning model in accordance with the training data set and the weighted loss function $\mathcal{L}_w(x, \hat{x})$ to compute a trained continuous machine learning model; and outputting, by the computer system, the trained continuous machine learning model.

The label density $f_X(x)$ may be a probability density function of the training data set.

The weight function $w(x)$ may be computed in accordance with a weighting parameter $\Delta$ reflecting a ratio between a maximum weight and minimum weight of the weighting function.

The weight function $w(x)$ may be computed by:

$$w(x) = k_1 \frac{1}{f_X(x)} + k_2,$$

wherein $$k_1 = \frac{\Delta - 1}{\max_x\left(\frac{1}{f_X(x)}\right) + C(\Delta - 1) - \Delta \min_x\left(\frac{1}{f_X(x)}\right)}$$

and $$k_2 = 1 - Ck_1,$$

and wherein C may be a sample mean of a reciprocal of the label density $f_X(x)$:

$$C = \overline{\left(\frac{1}{f_X(x)}\right)}.$$

The sample mean of the weight function $w(x)$ may be 1:

$$\overline{w(x)} = 1.$$

Weighting the loss function $\mathcal{L}(x, \hat{x})$ may include multiplying the loss function $\mathcal{L}(x, \hat{x})$ by the weight function $w(x)$ to compute the weighted loss function $\mathcal{L}_w(x, \hat{x})$:

$$\mathcal{L}_w(x, \hat{x}) = \frac{1}{N} \sum_{i=1}^{N} w(x) \mathcal{L}_b(x_n, \hat{x}_n).$$

Training the continuous machine learning model includes iteratively updating a plurality of parameters of the continuous machine learning model in accordance with gradient descent to minimize the weighted loss function $\mathcal{L}_w(x, \hat{x})$ with respect to the training data set.

According to one embodiment of the present disclosure, a system for training a machine learning model includes: a processor; and memory storing instructions that, when executed by the processor, cause the processor to: receive a training data set including imbalanced data; compute a measure of label density $f_X(x)$ of the training data set; compute a weight function $w(x)$ including a term that is inversely proportional to the label density; weight a loss function $\mathcal{L}(x, \hat{x})$ in accordance with the weight function to generate a weighted loss function $\mathcal{L}_w(x, \hat{x})$; train a continuous machine learning model in accordance with the training data set and the weighted loss function $\mathcal{L}_w(x, \hat{x})$; and output the trained continuous machine learning model.

The label density $f_X(x)$ may be a probability density function of the training data set.

The memory may store instructions to compute the weight function $w(x)$ in accordance with a weighting parameter $\Delta$ reflecting a ratio between a maximum weight and minimum weight of the weighting function.

The weight function $w(x)$ may be computed by:

$$w(x) = k_1 \frac{1}{f_X(x)} + k_2,$$

wherein $$k_1 = \frac{\Delta - 1}{\max_x\left(\frac{1}{f_X(x)}\right) + C(\Delta - 1) - \Delta \min_x\left(\frac{1}{f_X(x)}\right)}$$

-continued and $k_2 = 1 - Ck_1,$ and wherein C may be a sample mean of a reciprocal of the label density $f_X(x)$:

$$C = \overline{\left(\frac{1}{f_X(x)}\right)}.$$

The sample mean of the weight function w(x) may be 1:

$\overline{w}(x)=1.$

The instructions to weight the loss function $\mathcal{L}(x, \hat{x})$ may include instructions to multiply the loss function $\mathcal{L}(x, \hat{x})$ by the weight function w(x) to compute the weighted loss function $\mathcal{L}_w(x, \hat{x})$:

$$\mathcal{L}_w(x, \hat{x}) = \frac{1}{N}\sum_{i=1}^{N} w(x) \, \mathcal{L}_b(x_n, \hat{x}_n).$$

The instructions to train the continuous machine learning model may include instructions to iteratively update a plurality of parameters of the continuous machine learning model in accordance with gradient descent to minimize the weighted loss function $\mathcal{L}_w(x, \hat{x})$ with respect to the training data set.

BRIEF DESCRIPTION OF THE DRAWINGS

The accompanying drawings, together with the specification, illustrate exemplary embodiments of the present disclosure, and, together with the description, serve to explain the principles of the present disclosure.

FIG. 9 is a schematic block diagram of a computer system according to some embodiments of the present disclosure.

DETAILED DESCRIPTION

In the following detailed description, only certain exemplary embodiments of the present disclosure are shown and described, by way of illustration. As those skilled in the art would recognize, embodiments of the disclosure may take many different forms and should not be construed as being limited to the embodiments set forth herein.

Generally, machine learning models are trained by adjusting parameters of the machine learning model to minimize a loss function in accordance with a training data set. In particular, the loss function can be interpreted as representing an error or difference between the ground truth of the training data set and the predictions made by the machine learning model, as configured by its current set of parameters. During each iteration of a training process, the parameters of the model are updated (e.g., using gradient descent) to reduce the error computed by the loss function, thereby reducing the magnitude of the error and bringing the predictions of the model in line with the training data.

However, in some circumstances, the samples contained in the training data may be imbalanced (e.g., not be evenly or uniformly distributed over the domain) in which the model is intended to operate. Furthermore, a user of the model may be particularly interested in predictions in a particular portion of the domain, but imbalances in the distribution of the training data may result in the data being relatively sparse in that particular portion. The imbalance in the data distribution can impact the accuracy of the predictions made in that portion, the portions of the data set having more samples have a greater impact on the overall loss score than the portions of the data set having fewer samples (e.g., the model may increase the accuracy in the denser parts of the data set at the expense of reduced accuracy in the sparser parts of the data set).

Figure 1:
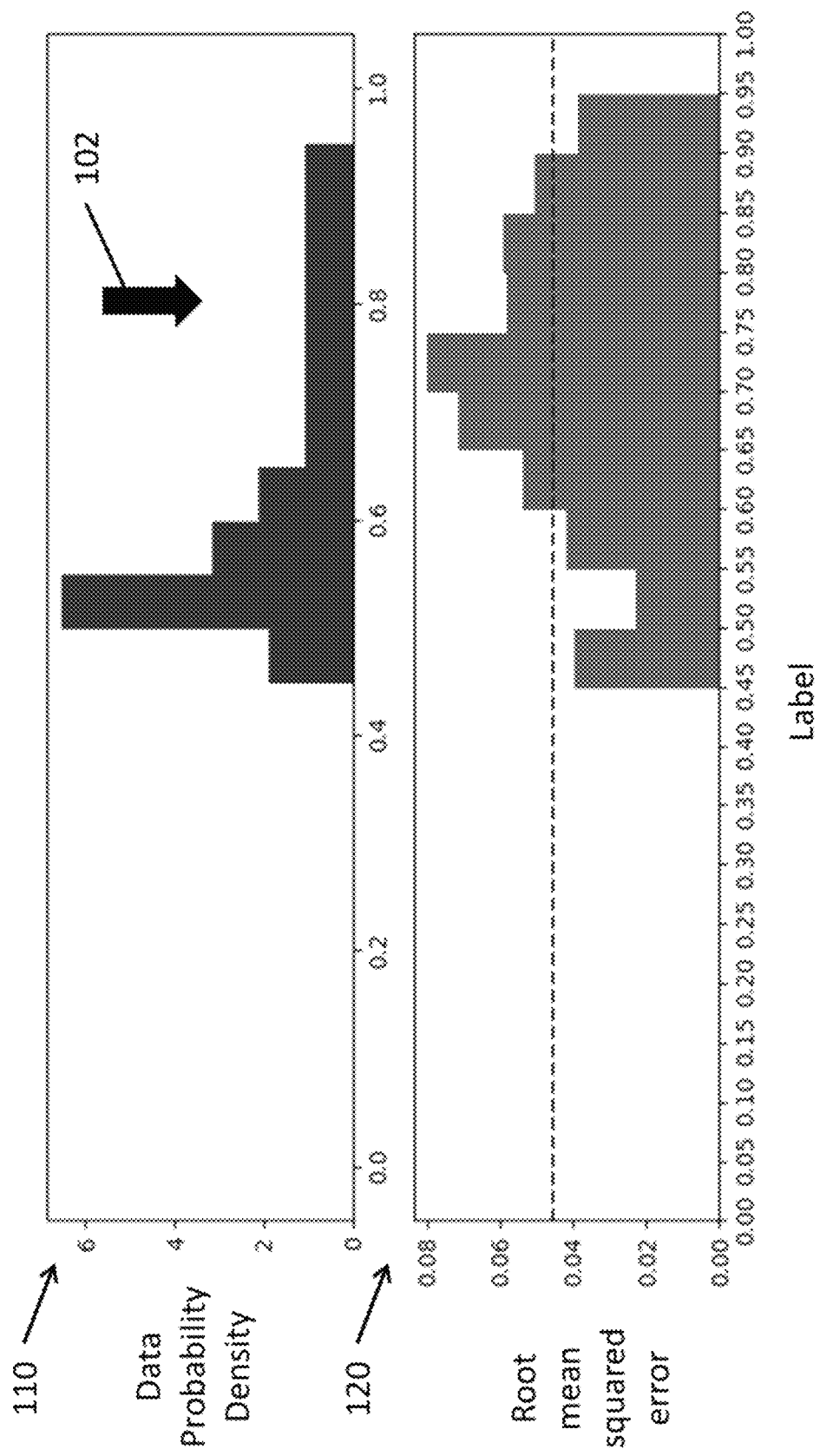
FIG. 1 shows two bar charts illustrating an example of the data probability density and error of a set of training data.

FIG. 1 shows two bar charts illustrating an example of the data probability density and error of a set of training data. The arrow 102 indicates a portion of the data of interest. However, as seen in bar graph 110, the data probability density in the region of interest is low (at label 0.75-0.80). As a result, is seen in bar graph 120, the root mean squared error for those data points is relatively high (approximately 0.05). On the other hand, bar graph 120 shows that the root mean squared error is relatively low (approximately 0.02) in a region where the data probability density is high (at label 0.50-0.55). As such, a machine learning model trained using this data may not be able to produce predictions with high precision in the portion of the domain labeled by arrow 102.

One example of a circumstance in which the training data is imbalanced relates to data collected from human test subjects. Collecting high quality experimental data from humans is generally expensive, due, for example, to issues of uniformity between the responses of different test subjects, the attention span and patience of those test subjects, and the time needed to collect those samples (e.g., humans may be relatively slow at generating data samples).

A specific example is collecting data from human test subjects to develop the above machine learning model to predict the perceived quality of an image compression algorithm from the original and reconstructed (compressed and decompressed models).

Figure 2:
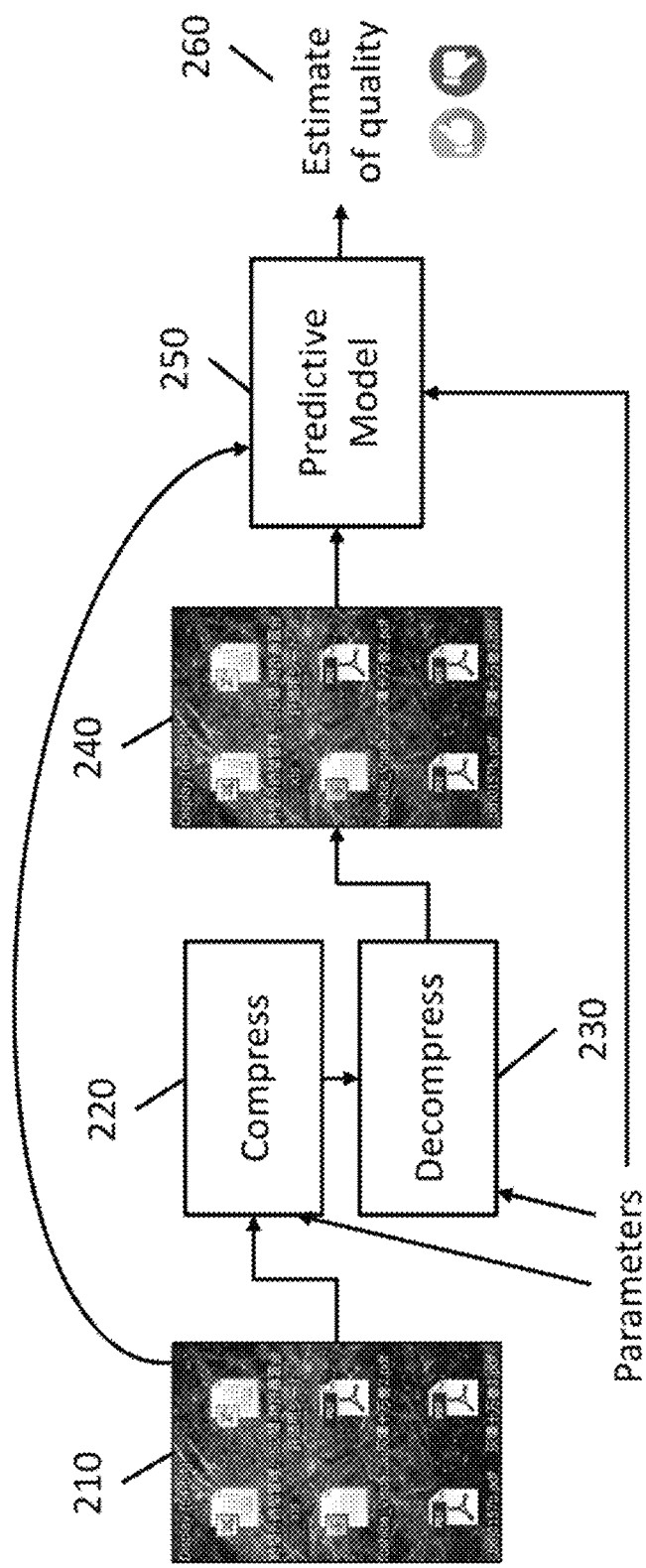
FIG. 2 is a schematic illustration of the use of a machine learning model to predict an estimate of quality of an image after compression and subsequent decompression.

FIG. 2 is a schematic illustration of the use of a machine learning model to predict an estimate of quality of an image after compression and subsequent decompression. In more detail, an original image 210 is compressed 220 and then decompressed 230 using an image compression algorithm to generate a reconstructed image 240, where the image compression algorithm is configured by one or more input parameters. The original image 210 and the reconstructed image 240 are supplied to a trained predictive model 250, which is trained to compute an estimate of quality 260 (e.g., a value from 0 to 1), representing how a human would perceive the quality level of the compression (e.g., whether there were detectable visual artifacts in the reconstructed image 240).

The predictive model 250 is trained using data collected by showing a collection of original images and corresponding reconstructed images to human test subjects, who would respond with estimates of quality (e.g., on a scale of 0.5 to 1) of the reconstructed images (e.g., by alternatingly displaying the original image and the reconstructed image and asking the test subject to identify the original image. A score of 1 is given to the correct answer and a score of 0 to the answer. The average of this score over multiple runs creates a number called Response Fraction (RF) which is a measure of image distortion. Numbers close to 0.5 indicate little difference between the original and reconstructed whereas numbers close to 1 indicate significant difference between the two. Response fractions less than 0.75 are typically considered as visually lossless.). However, a data imbalance may occur in that the best results may come from a particular range of input parameters to the compression algorithm, but the number of data samples collected from images compressed and decompressed with such settings may be relatively small. Specifically there are less data in the lossy region (response fraction >0.75) than the lossless region (response fraction <0.75).

Generally speaking, the precision of a trained machine learning model in a particular portion of its domain depends on the number of training samples in that portion of the domain.

Accordingly, aspects of embodiments of the present disclosure relate to systems and methods for training a continuous machine learning model, or a regression model, using imbalanced data.

Aspects of embodiments of the present disclosure may be contrasted with techniques used in the case of training models for classification (as opposed to regression). In particular, aspects of embodiments of the present disclosure relate to addressing imbalanced data in making predictions of continuous values (as opposed to discrete classifications), such as in regression models. One example of a technique used in training classification models from imbalanced training data (e.g., where there is a large disparity in the number of samples in different ones of the classes) includes oversampling (or duplicating) data points in the underrepresented classes (classes with fewer samples) in the training data and performing the training with this modified data set. In contrast, aspects of embodiments of the present disclosure relate to modifying the loss function in accordance with the imbalance in the data for training of continuous machine learning models.

Figure 3:
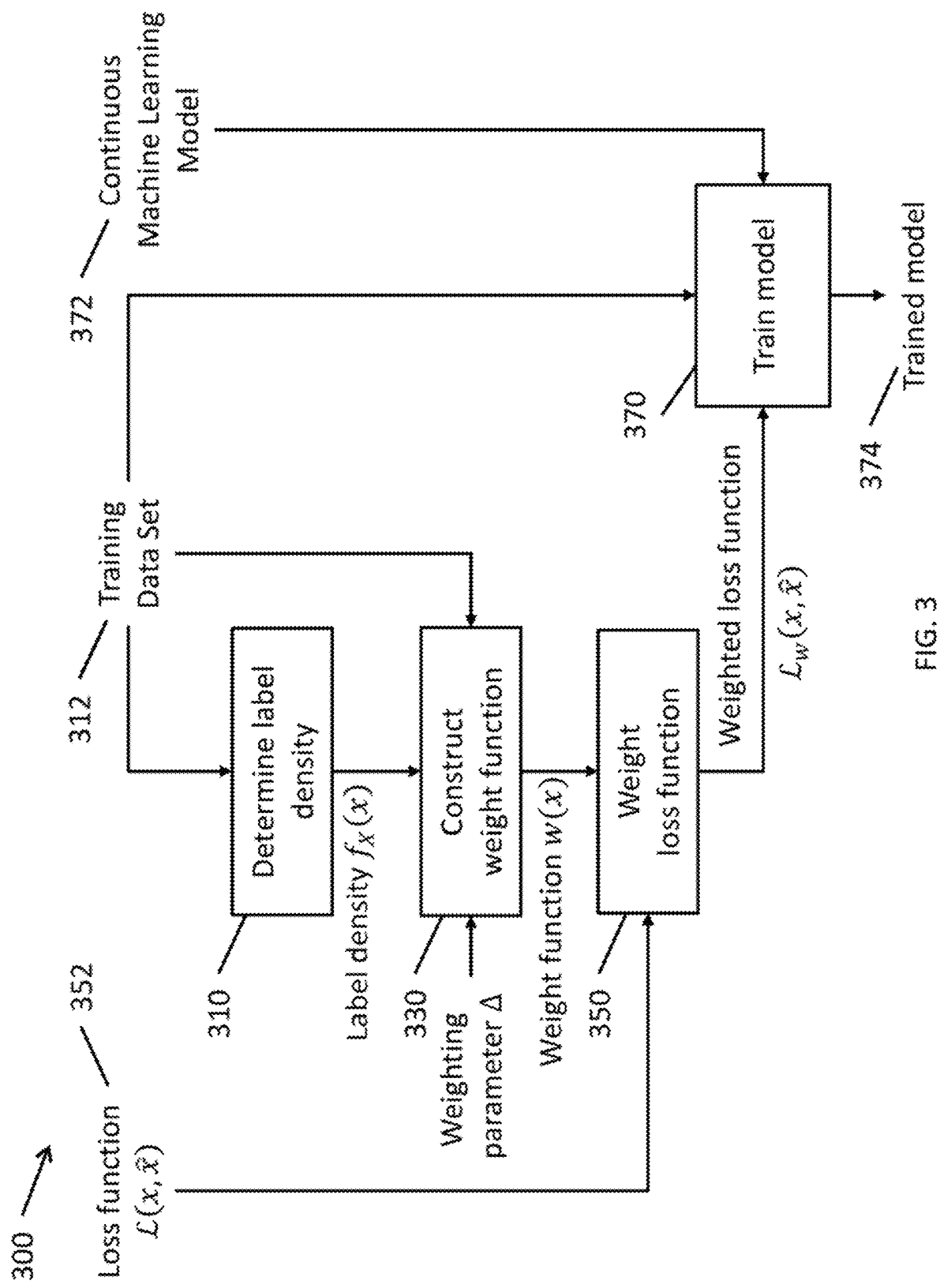
FIG. 3 is a flowchart of a method according to one embodiment of the present disclosure for training a continuous machine learning model (or regression model) from an imbalanced training data set.

FIG. 3 is a flowchart of a method 300 according to one embodiment of the present disclosure for training a continuous machine learning model or regression model from an imbalanced training data set. Methods for training a continuous machine learning model or a regression model according to various embodiments of the present disclosure are implemented in a computer system (described in more detail below). The configuration of a computer system to perform specific functions in accordance with embodiments of the present disclosure results in a special purpose computer configured to train a continuous machine learning model or regression model based on imbalanced data, where the domain and/or the range of the data are continuous.

In operation 310, the computer system determines a label density $f_X(x)$ of the training data 312, where the label density $f_X(x)$ represents the distribution of the labels of the samples of the training data set 312 over domain X as a function of independent variable $x \in X$. According to some embodiments of the present disclosure, the computer system computes the label density $f_X(x)$ of the training data by computing or estimating a probability density function (pdf) of the data. In some embodiments, the label density $f_X(x)$ is computed using kernel density estimation to estimate the pdf of the data, but embodiments of the present disclosure are not limited thereto and other techniques for determining or estimating the label density of the training data set may be used.

In operation 330, the computer system constructs a weight function $w(x)$ based on the label density $f_X(x)$ and a weighting parameter $\Delta$. The weighting parameter $\Delta$ may be supplied from an outside source (such as a user configuring the training process). In some embodiments of the present disclosure, the weight function $w(x)$ includes a term that is inversely proportional to the label density $f_X(x)$. For example, in one embodiment of the present disclosure, the weight function $w(x)$ is defined as:

$$w(x) = k_1 \frac{1}{f_X(x)} + k_2$$

where the sample mean of the weight function $w(x)$ is 1:

$$\overline{w}(x) = 1$$

and where the weighting parameter $\Delta$ corresponds to a maximum ratio of the maximum weight to the minimum weight of the weighting function $w(x)$.

$$\frac{\max\limits_x w(x)}{\min\limits_x w(x)} = \Delta \in [1, \infty)$$

In the case where the weighting parameter $\Delta=1 \Rightarrow w(x)=1$, indicating that the weight function $w(x)$ has no effect when the weighting parameter $\Delta$ is set to 1 (e.g., a baseline condition), because the ratio of the maximum weight to the minimum weight is 1.

The above set of parameters ensure that $w(x) \geq 0$ for all x.

Solving the above equations for parameters $k_1$ and $k_2$ gives:

$$k_1 = \frac{\Delta - 1}{\max\limits_x \left(\frac{1}{f_X(x)}\right) + C(\Delta - 1) - \Delta \min\limits_x \left(\frac{1}{f_X(x)}\right)}$$

and $$k_2 = 1 - Ck_1$$

where C is the sample mean of the reciprocal of the label density $f_X(x)$:

$$C = \left(\frac{1}{f_X(x)}\right)$$

Figure 4:
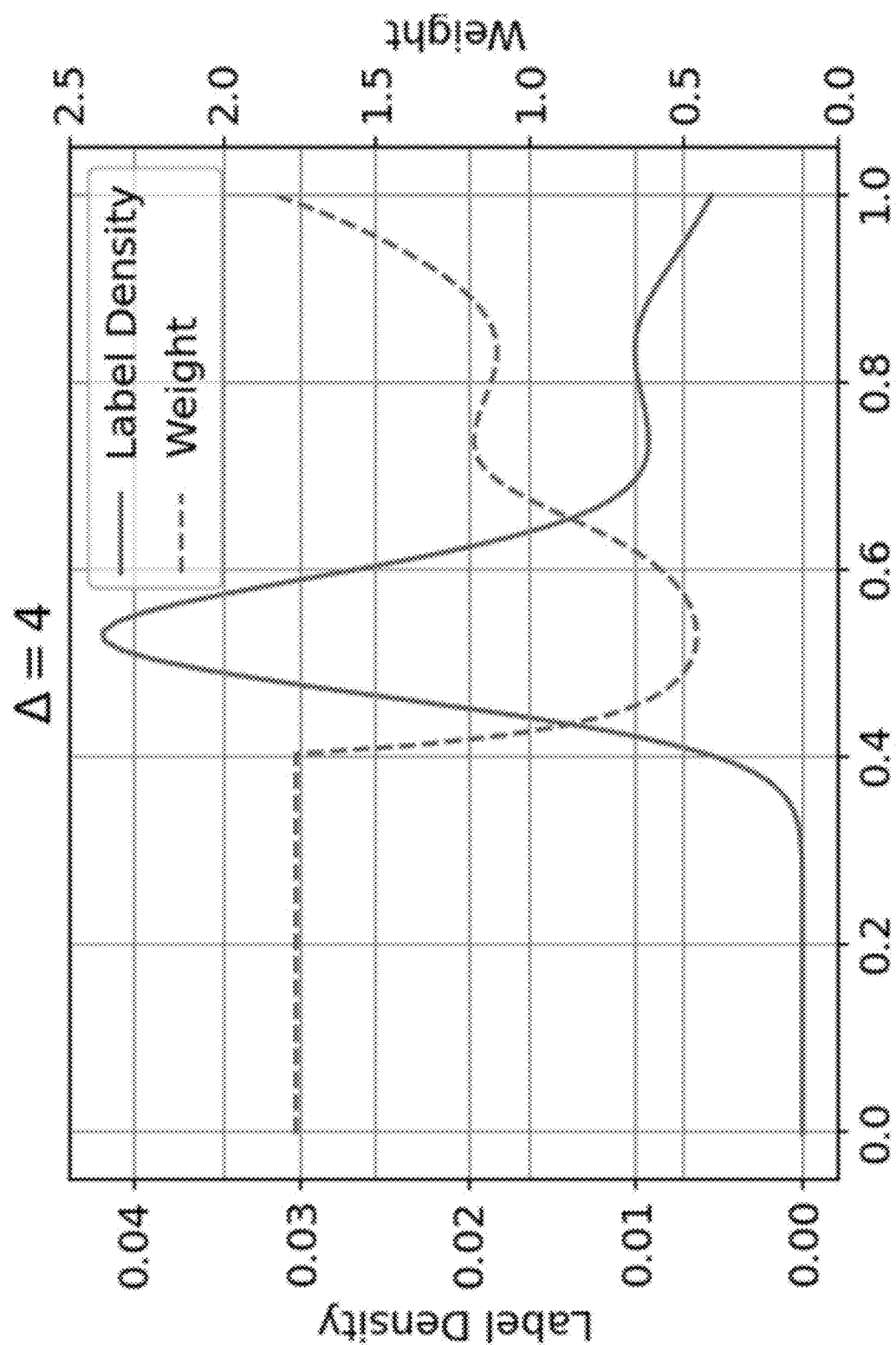
FIG. 4 is a graph showing an example of a label density $f_X(x)$ (solid line) and a computed weight function w(x) (dashed line) for weighting parameter Δ=4 according to one embodiment of the present disclosure.

FIG. 4 is a graph showing an example of a label density $f_X(x)$ (solid line) and a computed weight function w(x) (dashed line) for weighting parameter Δ=4 according to one embodiment of the present disclosure. As shown in FIG. 4, the weight function w(x) is generally inversely proportional to the label density function $f_X(x)$. In more detail, the label density $f_X(x)$ is at or near zero (less than or equal to 0.005) for values of x from 0.0 to 0.4, accordingly the weight function w(x) is at 1.75 at values of x from 0.0 to 0.4. Between values of x from 0.4 to 0.7, the label density $f_X(x)$ rises to a peak above 0.04 and falls back to about 0.01. In accordance with the term of the weight function w(x) that is inversely proportional to the label density $f_X(x)$, the weight function w(x) drops to a minimum of 0.5 between values of x from 0.4 to 0.7. For values of x between 0.7 and 1.0, the label density $f_X(x)$ falls to values in the range of 0.005 and 0.01. The weight function w(x) behaves accordingly and rises to values of about 1.1 to 1.75. In circumstances where the training data set is substantially balanced, the label density $f_X(x)$ is substantially constant, and therefore the weight function w(x) is substantially equal to 1 over the domain X. As such, embodiments of the present disclosure can be applied to data sets having varying degrees of imbalance, where the weight function w(x) accommodates for different degrees of imbalance based on the computed label density $f_X(x)$ of the data set.

In operation 350, the computer system weights the loss function $\mathcal{L}(x, \hat{x})$ 352 using the weight function w(x) constructed in operation 330. For example, a loss function $\mathcal{L}(x, \hat{x})$ for a data set may be computed as the sum of the individual losses from the individual samples of the data set:

$$\mathcal{L}(x, \hat{x}) = \frac{1}{N}\sum_{i=1}^{N}\mathcal{L}_b(x_n, \hat{x}_n)$$

where x represents values of the data set, $\hat{x}$ represents values predicted by the model, N is the size or cardinality of the data set, $x_n$ represents an n-th value of the data set, and $\hat{x}_n$ is a prediction by the model corresponding to the value $x_n$ (e.g., based on the same independent variables of $x_n$).

As one example, the function $\mathcal{L}_b(x, \hat{x})$ for calculating the loss of a single data point may be a square of a difference:

$$\mathcal{L}_b(x, \hat{x}) = |x-\hat{x}|^2$$

such that the loss function $\mathcal{L}(x, \hat{x})$ calculates a mean squared error (MSE).

However, embodiments of the present disclosure are not limited thereto and may be implemented using different functions, such as an absolute difference:

$$\mathcal{L}_b(x, \hat{x}) = |x-\hat{x}|^2$$

such that the loss function $\mathcal{L}(x, \hat{x})$ calculates a mean absolute error (MAE).

According to one embodiment of the present disclosure, weighting the loss function $\mathcal{L}(x, \hat{x})$ to generate a weighted loss function $\mathcal{L}_w(x, \hat{x})$ is performed by multiplying the loss for any given data point by its corresponding weight:

$$\mathcal{L}_w(x, \hat{x}) = \frac{1}{N}\sum_{i=1}^{N}w(x)\mathcal{L}_b(x_n, \hat{x}_n)$$

As noted above, if Δ=1, then w(x) =1. Therefore, the weight function w(x) has no effect on the loss function and $\mathcal{L}_w(x, \hat{x})=\mathcal{L}(x, \hat{x})$ when Δ=1.

In operation 370, the computer system trains a machine learning model 372 (e.g., a continuous machine learning model or a regression machine learning model) based on the training data set 312 using the weighted loss function $\mathcal{L}_w(x, \hat{x})$ to generate a trained model 374. The training performed in operation 370 may be performed using standard techniques for learning the parameters of a machine learning model 372, such as performing gradient descent to minimize the loss function. The result of the training is a trained model 374 that includes one or more values that configure the underlying model 372 to compute predictions or inferences that are consistent with the training data set 312 (e.g., that minimize the loss function $\mathcal{L}_w(x, \hat{x})$). As noted above, the training data set 312 may be a portion of an input data set, where a portion of the input data set is reserved as a test data set for evaluating the ability of the trained model 374 to make accurate inferences on data points outside of its training data.

As examples, embodiments of the present disclosure are applied to training a ridge regression model and a support vector machine model on an imbalanced data set, in particular, a collection of house prices in Ames, Iowa from the years 2006 through 2010. The Ames data set in this example includes 1,400 samples, each with 80 features and a sale price. One example of a portion of a sample is:

| Feature | Example | Sale Price ($) |
| --- | --- | --- |
| Square footage | 840 | 208,000 |
| Neighborhood | A | |
| # bathrooms | 3 | |
| Year of sale | 2008 | |
| Condition (0-5) | 3 | |
| ... etc | | |

Figure 5:
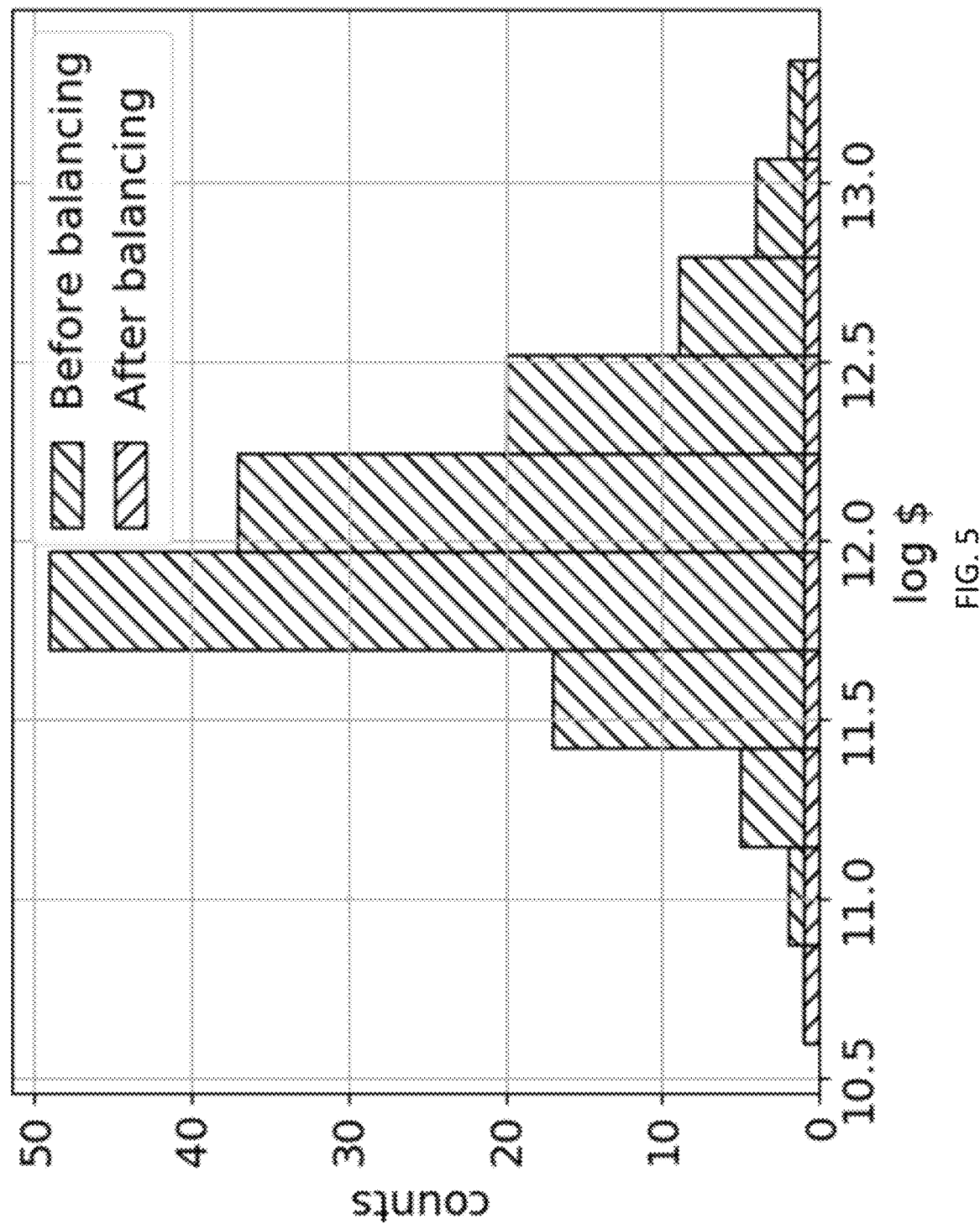
FIG. 5 is a histogram showing the counts (cardinality) of log-scale sale price bins of samples both before and after a balancing procedure according to one embodiment of the present disclosure.

To evaluate methods in accordance with embodiments of the present disclosure, a uniformly distributed testing data set was generated from the imbalanced Ames data set. FIG. 5 is a histogram showing the counts (cardinality) of log-scale sale price bins of samples both before and after a balancing procedure according to one embodiment of the present disclosure. In some embodiments, 10% of the original data set was randomly sampled and withheld from use as training data to form the testing data test. The sale prices of the samples are rescaled to a log-scale and binned into a histogram. According to some embodiments, the histogram is computed with as many bins as possible, so long as no bin was empty. In the example shown in FIG. 5, this resulted in ten bins.

As seen in FIG. 5, before balancing, largest bin has nearly 50 samples, and the second largest bin has nearly 40 data points. In contrast, half of the bins have less than 5 samples each, and eight of the bins have fewer than 20 samples each.

Figure 6:
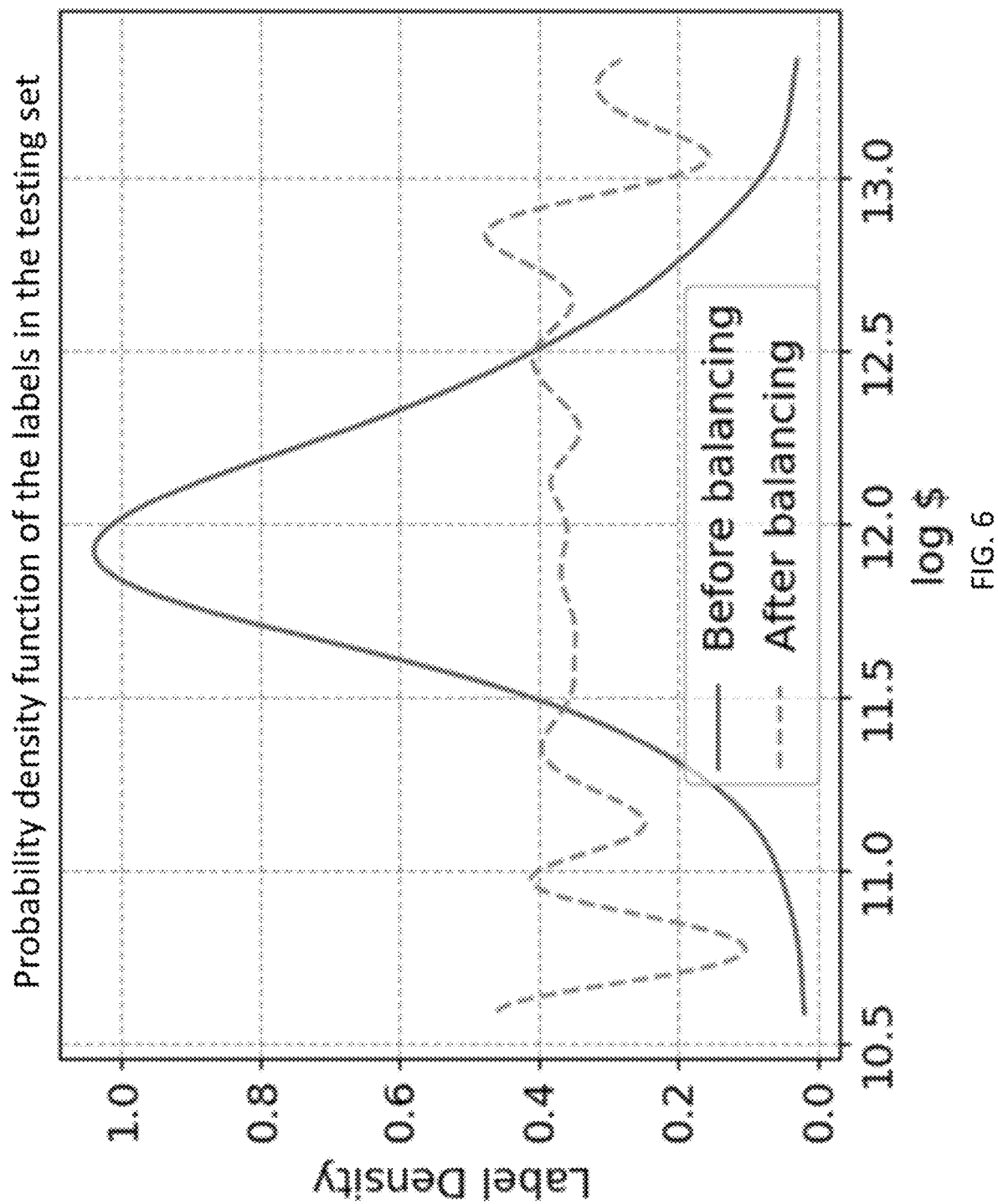
FIG. 6 is a graph showing the probability density function (PDF) of the labels (sale prices) in the testing data set before and after a balancing procedure.

A uniform data set was then generated by randomly selecting one sample from each bin, as shown in the "after balancing" portion of FIG. 5. This process may be repeated many times to generate a larger uniform testing data set. FIG. 6 is a graph showing the probability density function of the labels (sale prices) in the testing data set before and after the balancing procedure described above, where kernel density estimation is used to estimate the continuous probability density function from the data that was than binned into a histogram as in FIG. 5. As shown in FIG. 6, the distribution after balancing (as shown by the dotted line) is much more uniform than before balancing (as shown by the solid line).

Figure 7:
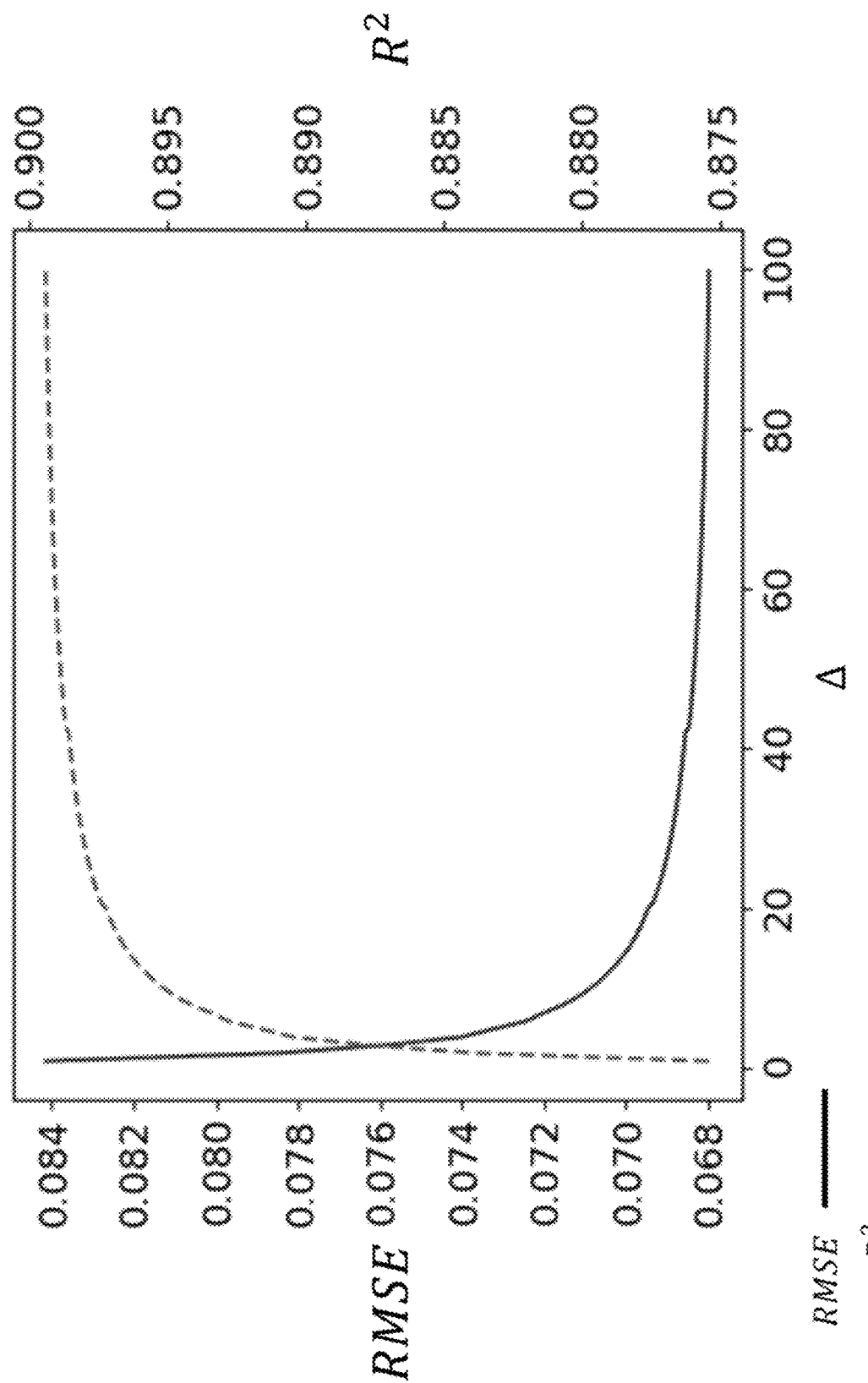
FIG. 7 is a graph showing the results of training a ridge regression model as the continuous machine learning model using a method in accordance with embodiments of the present disclosure for values of the weighting parameter Δ ranging from 1 to 100.

FIG. 7 is a graph showing the results of training a ridge regression model as the continuous machine learning model using a method in accordance with embodiments of the present disclosure for values of the weighting parameter Δ ranging from 1 to 100. As shown in the table below, the coefficient of determination ($R^2$) increases as the weighting parameter Δ increases, and the root mean squared error (RMSE) decreases as the weighting parameter Δ increases, when the predictions made by the trained ridge regression model are compared against the testing (uniform) data described above:

| Δ | $R^2$ (↑) | RMSE (↓) |
|---|---|---|
| 1 (baseline) | .875 | .084 |
| 10 | .895 | .071 |
| 100 | .899 | .068 |

As shown in the above table and in FIG. 7, increasing the weighting parameter Δ improves the quality of the predictions made by the trained ridge regression model compared to the model trained with an unweighted, baseline loss function $\mathcal{L}$ when Δ=1, with diminishing returns when the loss function $\mathcal{L}$ is weighted in accordance with larger values of the weighting parameter at Δ=10 and Δ=100.

Figure 8:
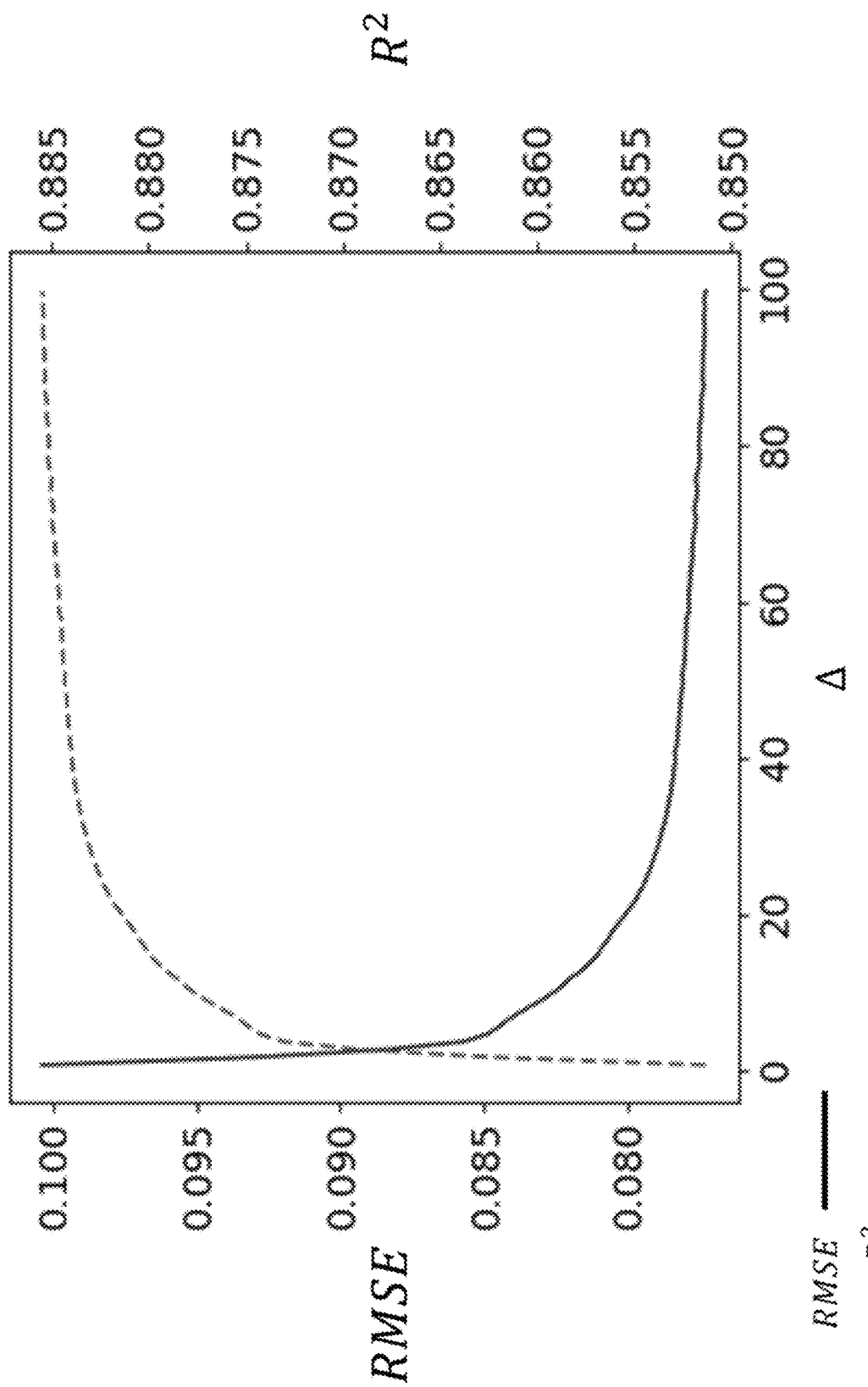
FIG. 8 is a graph showing the results of training a support vector regression model as the continuous machine learning model using a method in accordance with embodiments of the present disclosure for values of the weighting parameter Δ ranging from 1 to 100.

FIG. 8 is a graph showing the results of training a support vector regression model as the continuous machine learning model using a method in accordance with embodiments of the present disclosure for values of the weighting parameter Δ ranging from 1 to 100. As shown in the table below, the coefficient of determination ($R^2$) increases as the weighting parameter Δ increases, and the root mean squared error (RMSE) decreases as the weighting parameter Δ increases, when the predictions made by the trained support vector regression model are compared against the testing data:

| Δ | $R^2$ (↑) | RMSE (↓) |
|---|---|---|
| 1 (baseline) | .851 | .100 |
| 10 | .877 | .083 |
| 100 | .885 | .077 |

As shown in the above table and in FIG. 8, increasing the weighting parameter Δ improves the quality of the predictions made by the trained support vector regression model compared to the model trained with an unweighted, baseline loss function $\mathcal{L}$ when Δ=1, with diminishing returns when the loss function $\mathcal{L}$ is weighted based on larger values of the weighting parameter at Δ=10 and Δ=100.

As such, embodiments of the present disclosure are directed to systems and methods for training a continuous machine learning model by weighting a loss function used to train the model to compensate for imbalances in the distribution of the training data across the input domain.

FIG. 9 is a schematic block diagram of a computer system according to some embodiments of the present disclosure. As shown in FIG. 9, in some embodiments, a computer system 900 includes a processor 902 and memory 904. The memory 904 may include dynamic random access memory (DRAM) and persistent memory (e.g., flash memory, a hard disk drive, and the like). The memory 904 stores instructions that, when executed by the processor, cause the processor to implement a method in accordance with embodiments of the present disclosure, as described above. In some embodiments of the present disclosure, the method is distributed across multiple processing cores, multiple processors, and/or multiple computers (e.g., separate combinations of processors and memory in communication via a data connection such as a network connection). In some embodiments of the present disclosure, the computer system further includes one or more co-processors or accelerators 906. The one or more co-processors or accelerators 906 may include, for example, a graphics processing unit (GPU), a neural processing unit (e.g., a vector processor configured to implement activation functions of neural networks), and/or a field programmable gate array (FPGA), and portions and/or the entirety of methods according to embodiments of the present disclosure may be implemented on the one or more co-processors and/or accelerators. In some embodiments of the present disclosure, the processor 902 is a component of an FPGA, where the FPGA, as a whole may implement portions and/or the entirety of methods in accordance with embodiments of the present disclosure. The computer system 900 may also include one or more input/output peripherals 908, such as network adapters (e.g., Ethernet and/or WiFi adapters), universal serial bus (USB) adapters, display adapters, and the like.

During the training process 300, the memory 904 may further store the training data, computed intermediary values (e.g., the label density $f_X(x)$, the weight function w(x), the loss function $\mathcal{L}(x, \hat{x})$, the weighted loss function $\mathcal{L}_w(x, \hat{x})$, the parameters of the continuous model 372 being trained, and the trained continuous model 374. The trained continuous model 374 (e.g., the learned parameters of the model) may then be exported for use, e.g., for deployment and use for performing inferences or predictions in an end user computing device.

While the present disclosure includes certain exemplary embodiments, it is to be understood that the disclosure is not limited to the disclosed embodiments, but, on the contrary, is intended to cover various modifications and equivalent arrangements included within the spirit and scope of the appended claims, and equivalents thereof.

What is claimed is:

1. A method for training a machine learning model comprising:
    receiving, by a computer system comprising a processor and memory, a training data set comprising imbalanced data;
    computing, by the computer system, a label density $f_X(x)$ representing a continuous distribution of labels of the training data set over a domain X as a function of independent variable x ∈ X;
    computing, by the computer system, a weight function w(x) comprising a term that is inversely proportional to the label density representing a continuous distribution of labels of the training data set over a domain X as a function of independent variable x ∈ X;
    weighting, by the computer system, a loss function $\mathcal{L}(x, \hat{x})$ in accordance with the weight function to generate a weighted loss function $\mathcal{L}_w(x, \hat{x})$;
    training, by the computer system, a continuous machine learning model in accordance with the training data set and the weighted loss function $\mathcal{L}_w(x, \hat{x})$ to compute a trained continuous machine learning model configured to compute a prediction of a continuous value; and outputting, by the computer system, the trained continuous machine learning model,
where x represents a value of the training data set and where x̂ represents a continuous value predicted by the continuous machine learning model,
wherein the weight function w(x) is computed in accordance with a weighting parameter Δ greater than or equal to 1 reflecting a ratio between a maximum weight and minimum weight of the weight function.

2. The method of claim 1, wherein the label density $f_X(x)$ is a probability density function of the training data set.

3. The method of claim 1, wherein the weight function w(x) is computed by:

$$w(x) = k_1 \frac{1}{f_X(x)} + k_2$$

wherein $$k_1 = \frac{\Delta - 1}{\max_x\left(\frac{1}{f_X(x)}\right) + C(\Delta - 1) - \Delta \min_x\left(\frac{1}{f_X(x)}\right)}$$

and $$k_2 = 1 - Ck_1,$$

and wherein C is a sample mean of a reciprocal of the label density $f_X(x)$:

$$C = \overline{\left(\frac{1}{f_X(x)}\right)}.$$

4. The method of claim 3, wherein the sample mean of the weight function w(x) is 1:

$$\overline{w}(x) = 1.$$

5. The method of claim 1, wherein weighting the loss function $\mathcal{L}(x, x̂)$ comprises multiplying the loss function $\mathcal{L}(x, x̂)$ by the weight function w(x) to compute the weighted loss function $\mathcal{L}_w(x, x̂)$:

$$\mathcal{L}_w(x, x̂) = \frac{1}{N}\sum_{i=1}^{N} w(x) \mathcal{L}_b(x_n, x̂_n).$$

6. The method of claim 1, wherein training the continuous machine learning model comprises iteratively updating a plurality of parameters of the continuous machine learning model in accordance with gradient descent to minimize the weighted loss function $\mathcal{L}_w(x, x̂)$ with respect to the training data set.

7. A system for training a machine learning model comprising:
a processor; and
memory storing instructions that, when executed by the processor, cause the processor to:
receive a training data set comprising imbalanced data;
compute a label density $f_X(x)$ representing a continuous distribution of labels of the training data set over a domain X as a function of independent variable x ∈ X;
compute a weight function w(x) comprising a term that is inversely proportional to the label density representing a continuous distribution of labels of the training data set over a domain X as a function of independent variable x ∈ X;
weight a loss function $\mathcal{L}(x, x̂)$ in accordance with the weight function to generate a weighted loss function $\mathcal{L}_w(x, x̂)$;
train a continuous machine learning model in accordance with the training data set and the weighted loss function $\mathcal{L}_w(x, x̂)$; and
output the trained continuous machine learning model,
where x represents a value of the training data set and where x̂ represents a continuous value predicted by the continuous machine learning model,
wherein the memory stores instructions to compute the weight function w(x) in accordance with a weighting parameter Δ greater than or equal to 1 reflecting a ratio between a maximum weight and minimum weight of the weight function.

8. The system of claim 7, wherein the label density $f_X(x)$ is a probability density function of the training data set.

9. The system of claim 7, wherein the weight function w(x) is computed by:

$$w(x) = k_1 \frac{1}{f_X(x)} + k_2,$$

wherein $$k_1 = \frac{\Delta - 1}{\max_x\left(\frac{1}{f_X(x)}\right) + C(\Delta - 1) - \Delta \min_x\left(\frac{1}{f_X(x)}\right)}$$

and $$k_x = 1 - Ck_1,$$

and wherein C is a sample mean of a reciprocal of the label density $f_X(x)$:

$$C = \overline{\left(\frac{1}{f_X(x)}\right)}.$$

10. The system of claim 9, wherein the sample mean of the weight function w(x) is 1:

$$\overline{w}(x) = 1.$$

11. The system of claim 7, wherein the instructions to weight the loss function $\mathcal{L}(x, x̂)$ comprise instructions to multiply the loss function $\mathcal{L}(x, x̂)$ by the weight function w(x) to compute the weighted loss function $\mathcal{L}_w(x, x̂)$:

$$\mathcal{L}_w(x, x̂) = \frac{1}{N}\sum_{i=1}^{N} w(x) \mathcal{L}_b(x_n, x̂_n).$$

12. The system of claim 7, wherein the instructions to train the continuous machine learning model comprise instructions to iteratively update a plurality of parameters of the continuous machine learning model in accordance with gradient descent to minimize the weighted loss function $\mathcal{L}_w(x, x̂)$ with respect to the training data set.

* * * * *